US012400630B2

(12) United States Patent
Boesen

(10) Patent No.: US 12,400,630 B2
(45) Date of Patent: *Aug. 26, 2025

(54) SELECTIVE AUDIO ISOLATION FROM BODY GENERATED SOUND SYSTEM AND METHOD

(71) Applicant: BRAGI GmbH, Munich (DE)

(72) Inventor: Peter Vincent Boesen, Munich (DE)

(73) Assignee: BRAGI GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/436,577

(22) Filed: Feb. 8, 2024

(65) Prior Publication Data

US 2024/0185824 A1 Jun. 6, 2024

Related U.S. Application Data

(63) Continuation of application No. 17/879,319, filed on Aug. 2, 2022, now Pat. No. 11,908,442, which is a (Continued)

(51) Int. Cl.
*G10K 11/178* (2006.01)
*H04R 1/10* (2006.01)

(52) U.S. Cl.
CPC ......... *G10K 11/178* (2013.01); *H04R 1/1083* (2013.01); *G10K 2210/1081* (2013.01); (Continued)

(58) Field of Classification Search
CPC .. H04R 1/1041; H04R 1/1016; H04R 1/1083; G10K 11/178; G10K 2210/3045; G10K 2210/3028; G10K 2210/1081
(Continued)

(56) References Cited

U.S. PATENT DOCUMENTS

| | | | |
|---|---|---|---|
| 2,325,590 | A | 7/1943 | Carlisle et al. |
| 2,430,229 | A | 11/1947 | Kelsey |

(Continued)

FOREIGN PATENT DOCUMENTS

| | | | |
|---|---|---|---|
| CN | 204244472 | U | 4/2015 |
| CN | 104683519 | A | 6/2015 |

(Continued)

OTHER PUBLICATIONS

Akkermans, "Acoustic Ear Recognition for Person Identification", Automatic Identification Advanced Technologies, 2005 pp. 219-223.

(Continued)

*Primary Examiner* — Disler Paul
(74) *Attorney, Agent, or Firm* — Goodhue, Coleman & Owens, P.C.

(57) ABSTRACT

A wireless earpiece includes a wireless earpiece housing, a processor disposed within the wireless earpiece housing, at least one microphone operatively connected to the processor, and at least one speaker operatively connected to the processor. The processor is configured to receive audio from the at least one microphone, perform processing of the audio to provide processed audio, and output the processed audio to the at least one speaker. The processing of the audio involves identifying body generated sounds generated by a body of a user of the wireless earpiece and removing the body generated sounds.

16 Claims, 6 Drawing Sheets

Related U.S. Application Data continuation of application No. 17/147,329, filed on Jan. 12, 2021, now Pat. No. 11,417,307, which is a continuation of application No. 16/101,894, filed on Aug. 13, 2018, now Pat. No. 10,896,665, which is a continuation of application No. 15/801,045, filed on Nov. 1, 2017, now Pat. No. 10,062,373.

(60) Provisional application No. 62/417,195, filed on Nov. 3, 2016.

(52) U.S. Cl.
CPC ................ *G10K 2210/3028* (2013.01); *G10K 2210/3045* (2013.01); *H04R 1/1016* (2013.01); *H04R 1/1041* (2013.01); *H04R 2201/107* (2013.01)

(58) Field of Classification Search
USPC ....................... 381/71.1, 71.6, 74, 94.1, 94.3
See application file for complete search history.

(56) References Cited

U.S. PATENT DOCUMENTS

| | | | |
|---|---|---|---|
| 3,047,089 | A | 7/1962 | Zwislocki |
| D208,784 | S | 10/1967 | Sanzone |
| 3,586,794 | A | 6/1971 | Michaelis |
| 3,696,377 | A | 10/1972 | Wall |
| 3,934,100 | A | 1/1976 | Harada |
| 3,983,336 | A | 9/1976 | Malek et al. |
| 4,069,400 | A | 1/1978 | Johanson et al. |
| 4,150,262 | A | 4/1979 | Ono |
| 4,334,315 | A | 6/1982 | Ono et al. |
| D266,271 | S | 9/1982 | Johanson et al. |
| 4,375,016 | A | 2/1983 | Harada |
| 4,588,867 | A | 5/1986 | Konomi |
| 4,617,429 | A | 10/1986 | Bellafiore |
| 4,654,883 | A | 3/1987 | Iwata |
| 4,682,180 | A | 7/1987 | Gans |
| 4,791,673 | A | 12/1988 | Schreiber |
| 4,852,177 | A | 7/1989 | Ambrose |
| 4,865,044 | A | 9/1989 | Wallace et al. |
| 4,984,277 | A | 1/1991 | Bisgaard et al. |
| 5,008,943 | A | 4/1991 | Arndt et al. |
| 5,185,802 | A | 2/1993 | Stanton |
| 5,191,602 | A | 3/1993 | Regen et al. |
| 5,201,007 | A | 4/1993 | Ward et al. |
| 5,201,008 | A | 4/1993 | Arndt et al. |
| D340,286 | S | 10/1993 | Seo |
| 5,280,524 | A | 1/1994 | Norris |
| 5,295,193 | A | 3/1994 | Ono |
| 5,298,692 | A | 3/1994 | Ikeda et al. |
| 5,343,532 | A | 8/1994 | Shugart |
| 5,347,584 | A | 9/1994 | Narisawa |
| 5,363,444 | A | 11/1994 | Norris |
| 5,444,786 | A | 8/1995 | Raviv |
| D367,113 | S | 2/1996 | Weeks |
| 5,497,339 | A | 3/1996 | Bernard |
| 5,606,621 | A | 2/1997 | Reiter et al. |
| 5,613,222 | A | 3/1997 | Guenther |
| 5,654,530 | A | 8/1997 | Sauer et al. |
| 5,689,252 | A | 11/1997 | Ayanoglu et al. |
| 5,692,059 | A | 11/1997 | Kruger |
| 5,721,783 | A | 2/1998 | Anderson |
| 5,748,743 | A | 5/1998 | Weeks |
| 5,749,072 | A | 5/1998 | Mazurkiewicz et al. |
| 5,771,438 | A | 6/1998 | Palermo et al. |
| D397,796 | S | 9/1998 | Yabe et al. |
| 5,802,167 | A | 9/1998 | Hong |
| 5,844,996 | A | 12/1998 | Enzmann et al. |
| D410,008 | S | 5/1999 | Almqvist |
| 5,929,774 | A | 7/1999 | Charlton |
| 5,933,506 | A | 8/1999 | Aoki et al. |
| 5,949,896 | A | 9/1999 | Nageno et al. |
| 5,987,146 | A | 11/1999 | Pluvinage et al. |
| 6,021,207 | A | 2/2000 | Puthuff et al. |
| 6,054,989 | A | 4/2000 | Robertson et al. |
| 6,081,724 | A | 6/2000 | Wilson |
| 6,084,526 | A | 7/2000 | Blotky et al. |
| 6,094,492 | A | 7/2000 | Boesen |
| 6,111,569 | A | 8/2000 | Brusky et al. |
| 6,112,103 | A | 8/2000 | Puthuff |
| 6,157,727 | A | 12/2000 | Rueda |
| 6,167,039 | A | 12/2000 | Karlsson et al. |
| 6,181,801 | B1 | 1/2001 | Puthuff et al. |
| 6,185,152 | B1 | 2/2001 | Shen |
| 6,208,372 | B1 | 3/2001 | Barraclough |
| 6,230,029 | B1 | 5/2001 | Yegiazaryan et al. |
| 6,275,789 | B1 | 8/2001 | Moser et al. |
| 6,339,754 | B1 | 1/2002 | Flanagan et al. |
| D455,835 | S | 4/2002 | Anderson et al. |
| 6,408,081 | B1 | 6/2002 | Boesen |
| 6,424,820 | B1 | 7/2002 | Burdick et al. |
| D464,039 | S | 10/2002 | Boesen |
| 6,470,893 | B1 | 10/2002 | Boesen |
| D468,299 | S | 1/2003 | Boesen |
| D468,300 | S | 1/2003 | Boesen |
| 6,522,266 | B1 | 2/2003 | Soehren et al. |
| 6,542,721 | B2 | 4/2003 | Boesen |
| 6,560,468 | B1 | 5/2003 | Boesen |
| 6,563,301 | B2 | 5/2003 | Gventer |
| 6,654,721 | B2 | 11/2003 | Handelman |
| 6,664,713 | B2 | 12/2003 | Boesen |
| 6,681,176 | B2 | 1/2004 | Funk et al. |
| 6,690,807 | B1 | 2/2004 | Meyer |
| 6,694,180 | B1 | 2/2004 | Boesen |
| 6,718,043 | B1 | 4/2004 | Boesen |
| 6,721,657 | B2 | 4/2004 | Ford et al. |
| 6,738,485 | B1 | 5/2004 | Boesen |
| 6,748,095 | B1 | 6/2004 | Goss |
| 6,754,358 | B1 | 6/2004 | Boesen et al. |
| 6,784,873 | B1 | 8/2004 | Boesen et al. |
| 6,807,445 | B2 | 10/2004 | Baumann |
| 6,823,195 | B1 | 11/2004 | Boesen |
| 6,852,084 | B1 | 2/2005 | Boesen |
| 6,879,698 | B2 | 4/2005 | Boesen |
| 6,892,082 | B2 | 5/2005 | Boesen |
| 6,920,229 | B2 | 7/2005 | Boesen |
| 6,952,483 | B2 | 10/2005 | Boesen et al. |
| 6,987,986 | B2 | 1/2006 | Boesen |
| 7,010,137 | B1 | 3/2006 | Leedom et al. |
| 7,113,611 | B2 | 9/2006 | Leedom et al. |
| D532,520 | S | 11/2006 | Kampmeier et al. |
| 7,136,282 | B1 | 11/2006 | Rebeske |
| 7,203,331 | B2 | 4/2007 | Boesen |
| 7,209,569 | B2 | 4/2007 | Boesen |
| 7,215,790 | B2 | 5/2007 | Boesen et al. |
| D549,222 | S | 8/2007 | Huang |
| D554,756 | S | 11/2007 | Sjursen et al. |
| 7,403,629 | B1 | 7/2008 | Aceti et al. |
| D579,006 | S | 10/2008 | Kim et al. |
| 7,447,630 | B2 | 11/2008 | Liu et al. |
| 7,463,902 | B2 | 12/2008 | Boesen |
| 7,508,411 | B2 | 3/2009 | Boesen |
| 7,532,901 | B1 | 5/2009 | LaFranchise et al. |
| 7,574,008 | B2 | 8/2009 | Zhang |
| D601,134 | S | 9/2009 | Elabidi et al. |
| 7,668,652 | B2 | 2/2010 | Spencer et al. |
| 7,825,626 | B2 | 11/2010 | Kozisek |
| 7,859,469 | B1 | 12/2010 | Rosener et al. |
| 7,965,855 | B1 | 6/2011 | Ham |
| 7,979,035 | B2 | 7/2011 | Griffin et al. |
| 7,983,628 | B2 | 7/2011 | Boesen |
| D647,491 | S | 10/2011 | Chen et al. |
| 8,095,188 | B2 | 1/2012 | Shi |
| 8,108,143 | B1 | 1/2012 | Tester |
| 8,140,357 | B1 | 3/2012 | Boesen |
| 8,238,967 | B1 | 8/2012 | Arnold et al. |
| 8,253,589 | B2 | 8/2012 | Grimm et al. |
| D666,581 | S | 9/2012 | Perez |
| 8,270,637 | B2 | 9/2012 | Abolfathi |
| 8,300,864 | B2 | 10/2012 | Müllenborn et al. |
| 8,383,925 | B2 | 2/2013 | Uehara |
| 8,406,448 | B2 | 3/2013 | Lin et al. |

(56) References Cited

U.S. PATENT DOCUMENTS 8,430,817 B1 4/2013 Al-Ali et al.
8,436,780 B2 5/2013 Schantz et al.
D687,021 S 7/2013 Yuen
8,483,416 B2 * 7/2013 Roeck .................. H04R 25/552 381/313
8,675,884 B2 3/2014 Yehuday
8,679,012 B1 3/2014 Kayyali
8,719,877 B2 5/2014 VonDoenhoff et al.
8,774,434 B2 7/2014 Zhao et al.
8,831,266 B1 9/2014 Huang
8,891,800 B1 11/2014 Shaffer
8,994,498 B2 3/2015 Agrafioti et al.
D728,107 S 4/2015 Martin et al.
9,013,145 B2 4/2015 Castillo et al.
9,037,125 B1 5/2015 Kadous
D733,103 S 6/2015 Jeong et al.
9,081,944 B2 7/2015 Camacho et al.
9,229,227 B2 1/2016 Border et al.
9,317,241 B2 4/2016 Tranchina
9,414,964 B2 * 8/2016 Censo .................. H04R 1/1083
9,461,403 B2 10/2016 Gao et al.
9,510,159 B1 11/2016 Cuddihy et al.
D773,439 S 12/2016 Walker
D775,158 S 12/2016 Dong
9,524,631 B1 12/2016 Agrawal et al.
D777,710 S 1/2017 Palmborg
9,544,689 B2 1/2017 Fisher et al.
D788,079 S 5/2017 Son et al.
9,684,778 B2 6/2017 Tharappel et al.
9,711,062 B2 7/2017 Ellis et al.
9,729,957 B1 * 8/2017 Kaller ...................... H04R 3/02
9,729,979 B2 8/2017 Özden
9,767,709 B2 9/2017 Ellis
9,786,265 B2 * 10/2017 Beckman ......... G10K 11/17857
9,818,005 B2 11/2017 Yeager et al.
9,821,767 B2 11/2017 Nixon
9,848,257 B2 12/2017 Ambrose et al.
10,056,069 B2 * 8/2018 Golani ...................... A61F 5/56
10,284,968 B2 * 5/2019 Van Dijk ............. H04R 25/305
2001/0005197 A1 6/2001 Mishra et al.
2001/0027121 A1 10/2001 Boesen
2001/0043707 A1 11/2001 Leedom
2001/0056350 A1 12/2001 Calderone et al.
2002/0002413 A1 1/2002 Tokue
2002/0007510 A1 1/2002 Mann
2002/0010590 A1 1/2002 Lee
2002/0030637 A1 3/2002 Mann
2002/0046035 A1 4/2002 Kitahara et al.
2002/0057810 A1 5/2002 Boesen
2002/0076073 A1 6/2002 Taenzer et al.
2002/0118852 A1 8/2002 Boesen
2003/0002705 A1 1/2003 Boesen
2003/0065504 A1 4/2003 Kraemer et al.
2003/0100331 A1 5/2003 Dress et al.
2003/0104806 A1 6/2003 Ruef et al.
2003/0115068 A1 6/2003 Boesen
2003/0125096 A1 7/2003 Boesen
2003/0218064 A1 11/2003 Conner et al.
2004/0070564 A1 4/2004 Dawson et al.
2004/0102931 A1 5/2004 Ellis et al.
2004/0160511 A1 8/2004 Boesen
2005/0017842 A1 1/2005 Dematteo
2005/0043056 A1 2/2005 Boesen
2005/0094839 A1 5/2005 Gwee
2005/0125320 A1 6/2005 Boesen
2005/0148883 A1 7/2005 Boesen
2005/0165663 A1 7/2005 Razumov
2005/0196009 A1 9/2005 Boesen
2005/0197063 A1 9/2005 White
2005/0212911 A1 9/2005 Marvit et al.
2005/0251455 A1 11/2005 Boesen
2005/0266876 A1 12/2005 Boesen
2006/0029246 A1 2/2006 Boesen
2006/0064037 A1 3/2006 Shalon
2006/0073787 A1 4/2006 Lair et al.
2006/0074671 A1 4/2006 Farmaner et al.
2006/0074808 A1 4/2006 Boesen
2006/0166715 A1 7/2006 Engelen et al.
2006/0166716 A1 7/2006 Seshadri et al.
2006/0220915 A1 10/2006 Bauer
2006/0258412 A1 11/2006 Liu
2007/0102009 A1 5/2007 Wong et al.
2007/0230714 A1 10/2007 Armstrong
2007/0239225 A1 10/2007 Saringer
2007/0242834 A1 10/2007 Coutinho et al.
2007/0247800 A1 10/2007 Smith et al.
2007/0269785 A1 11/2007 Yamanoi
2008/0013747 A1 1/2008 Tran
2008/0076972 A1 3/2008 Dorogusker et al.
2008/0090622 A1 4/2008 Kim et al.
2008/0102424 A1 5/2008 Holljes
2008/0146890 A1 6/2008 LeBoeuf
2008/0187163 A1 8/2008 Goldstein
2008/0215239 A1 9/2008 Lee
2008/0253583 A1 10/2008 Goldstein
2008/0254780 A1 10/2008 Kuhl et al.
2008/0255430 A1 10/2008 Alexandersson et al.
2008/0298606 A1 12/2008 Johnson et al.
2008/0318518 A1 12/2008 Coutinho et al.
2009/0003620 A1 1/2009 McKillop et al.
2009/0008275 A1 1/2009 Ferrari et al.
2009/0017881 A1 1/2009 Madrigal
2009/0041313 A1 2/2009 Brown
2009/0073070 A1 3/2009 Rofougaran
2009/0097689 A1 4/2009 Prest et al.
2009/0105548 A1 4/2009 Bart
2009/0154739 A1 6/2009 Zellner
2009/0182913 A1 7/2009 Rosenblatt et al.
2009/0191920 A1 7/2009 Regen et al.
2009/0226017 A1 9/2009 Abolfathi et al.
2009/0240947 A1 9/2009 Goyal et al.
2009/0245559 A1 10/2009 Boltyenkov et al.
2009/0261114 A1 10/2009 McGuire et al.
2009/0296965 A1 12/2009 Kojima
2009/0296968 A1 12/2009 Wu et al.
2009/0299215 A1 12/2009 Zhang
2009/0303073 A1 12/2009 Gilling et al.
2009/0304210 A1 12/2009 Weisman
2010/0007805 A1 1/2010 Vitito
2010/0033313 A1 2/2010 Keady et al.
2010/0075631 A1 3/2010 Black et al.
2010/0106356 A1 4/2010 Trepagnier et al.
2010/0166206 A1 7/2010 Macours
2010/0168075 A1 7/2010 Dahlstrom et al.
2010/0203831 A1 8/2010 Muth
2010/0210212 A1 8/2010 Sato
2010/0285771 A1 11/2010 Peabody
2010/0290636 A1 11/2010 Mao et al.
2010/0320961 A1 12/2010 Castillo et al.
2011/0018731 A1 1/2011 Linsky et al.
2011/0029041 A1 2/2011 Wiskerke
2011/0103609 A1 5/2011 Pelland et al.
2011/0137141 A1 6/2011 Razoumov
2011/0140844 A1 6/2011 McGuire et al.
2011/0140956 A1 6/2011 Henry et al.
2011/0239497 A1 10/2011 McGuire et al.
2011/0286615 A1 11/2011 Olodort et al.
2011/0293105 A1 12/2011 Arie et al.
2012/0057740 A1 3/2012 Rosal
2012/0155670 A1 6/2012 Rutschman
2012/0159617 A1 6/2012 Wu et al.
2012/0162891 A1 6/2012 Tranchina et al.
2012/0163626 A1 6/2012 Booij et al.
2012/0197737 A1 8/2012 LeBoeuf et al.
2012/0235883 A1 9/2012 Border et al.
2012/0309453 A1 12/2012 Maguire
2013/0106454 A1 5/2013 Liu et al.
2013/0154826 A1 6/2013 Ratajczyk
2013/0178967 A1 7/2013 Mentz
2013/0200999 A1 8/2013 Spodak et al.
2013/0204617 A1 8/2013 Kuo et al.
2013/0293494 A1 11/2013 Reshef
2013/0316642 A1 11/2013 Newham
2013/0343585 A1 12/2013 Bennett et al.

(56) References Cited

U.S. PATENT DOCUMENTS

2013/0346168 A1 12/2013 Zhou et al.
2014/0002357 A1 1/2014 Pombo et al.
2014/0004912 A1 1/2014 Rajakarunanayake
2014/0010391 A1 1/2014 Ek et al.
2014/0014697 A1 1/2014 Schmierer et al.
2014/0020089 A1 1/2014 Perini, II
2014/0072136 A1 3/2014 Tenenbaum et al.
2014/0072146 A1 3/2014 Itkin et al.
2014/0073429 A1 3/2014 Meneses et al.
2014/0079257 A1 3/2014 Ruwe et al.
2014/0106677 A1 4/2014 Altman
2014/0122116 A1 5/2014 Smythe
2014/0146973 A1 5/2014 Liu et al.
2014/0153768 A1 6/2014 Hagen et al.
2014/0163771 A1 6/2014 Demeniuk
2014/0185828 A1 7/2014 Helbling
2014/0219467 A1 8/2014 Kurtz
2014/0222462 A1 8/2014 Shakil et al.
2014/0235169 A1 8/2014 Parkinson et al.
2014/0237518 A1 8/2014 Liu
2014/0270227 A1 9/2014 Swanson
2014/0270271 A1 9/2014 Dehe et al.
2014/0276227 A1 9/2014 Pérez
2014/0279889 A1 9/2014 Luna
2014/0310595 A1 10/2014 Acharya et al.
2014/0321682 A1 10/2014 Kofod-Hansen et al.
2014/0335908 A1 11/2014 Krisch et al.
2014/0348367 A1 11/2014 Vavrus et al.
2015/0028996 A1 1/2015 Agrafioti et al.
2015/0035643 A1 2/2015 Kursun
2015/0036835 A1 2/2015 Chen
2015/0043765 A1 2/2015 Merks
2015/0056584 A1 2/2015 Boulware et al.
2015/0110587 A1 4/2015 Hori
2015/0124058 A1 5/2015 Okpeva et al.
2015/0148989 A1 5/2015 Cooper et al.
2015/0181356 A1 6/2015 Krystek et al.
2015/0230022 A1 8/2015 Sakai et al.
2015/0245127 A1 8/2015 Shaffer
2015/0256949 A1 9/2015 Vanpoucke et al.
2015/0264472 A1 9/2015 Aase
2015/0264501 A1 9/2015 Hu et al.
2015/0310720 A1 10/2015 Gettings et al.
2015/0317565 A1 11/2015 Li et al.
2015/0358751 A1 12/2015 Deng et al.
2015/0359436 A1 12/2015 Shim et al.
2015/0364058 A1 12/2015 Lagree
2015/0373467 A1 12/2015 Gelter
2015/0373474 A1 12/2015 Kraft et al.
2015/0379251 A1 12/2015 Komaki
2016/0033280 A1 2/2016 Moore
2016/0034249 A1 2/2016 Lee et al.
2016/0071526 A1 3/2016 Wingate et al.
2016/0072558 A1 3/2016 Hirsch et al.
2016/0073189 A1 3/2016 Lindén et al.
2016/0094550 A1 3/2016 Bradley et al.
2016/0100262 A1 4/2016 Inagaki
2016/0112811 A1 4/2016 Jensen
2016/0119737 A1 4/2016 Mehnert et al.
2016/0124707 A1 5/2016 Ermilov
2016/0125892 A1 5/2016 Bowen et al.
2016/0140870 A1 5/2016 Connor
2016/0142818 A1 5/2016 Park
2016/0162259 A1 6/2016 Zhao et al.
2016/0209691 A1 7/2016 Yang et al.
2016/0226713 A1 8/2016 Dellinger et al.
2016/0253994 A1 9/2016 Panchapagesan et al.
2016/0324478 A1 11/2016 Goldstein
2016/0345104 A1 11/2016 Margalit
2016/0345107 A1 11/2016 Van Dijk et al.
2016/0352818 A1 12/2016 Han et al.
2016/0353196 A1 12/2016 Baker et al.
2016/0360350 A1 12/2016 Watson et al.
2017/0021257 A1 1/2017 Gilbert
2017/0046503 A1 2/2017 Cho
2017/0059152 A1 3/2017 Hirsch et al.
2017/0060262 A1 3/2017 Hviid et al.
2017/0060269 A1 3/2017 Förstner et al.
2017/0061751 A1 3/2017 Loermann et al.
2017/0061817 A1 3/2017 May
2017/0062913 A1 3/2017 Hirsch et al.
2017/0064426 A1 3/2017 Hviid
2017/0064428 A1 3/2017 Hirsch
2017/0064432 A1 3/2017 Hviid et al.
2017/0064437 A1 3/2017 Hviid et al.
2017/0065228 A1 3/2017 Hirano
2017/0078780 A1 3/2017 Qian et al.
2017/0078785 A1 3/2017 Qian et al.
2017/0096065 A1 4/2017 Katsuno et al.
2017/0100277 A1 4/2017 Ke
2017/0108918 A1 4/2017 Boesen
2017/0109131 A1 4/2017 Boesen
2017/0110124 A1 4/2017 Boesen et al.
2017/0110899 A1 4/2017 Boesen
2017/0111723 A1 4/2017 Boesen
2017/0111725 A1 4/2017 Boesen et al.
2017/0111726 A1 4/2017 Martin et al.
2017/0111740 A1 4/2017 Hviid et al.
2017/0112671 A1 4/2017 Goldstein
2017/0119318 A1 5/2017 Shay et al.
2017/0127168 A1 5/2017 Briggs et al.
2017/0131094 A1 5/2017 Kulik
2017/0142511 A1 5/2017 Dennis
2017/0146801 A1 5/2017 Stempora
2017/0150920 A1 6/2017 Chang et al.
2017/0151085 A1 6/2017 Chang et al.
2017/0151447 A1 6/2017 Boesen
2017/0151668 A1 6/2017 Boesen
2017/0151918 A1 6/2017 Boesen
2017/0151930 A1 6/2017 Boesen
2017/0151957 A1 6/2017 Boesen
2017/0151959 A1 6/2017 Boesen
2017/0153114 A1 6/2017 Boesen
2017/0153636 A1 6/2017 Boesen
2017/0154532 A1 6/2017 Boesen
2017/0155985 A1 6/2017 Boesen
2017/0155992 A1 6/2017 Perianu et al.
2017/0155993 A1 6/2017 Boesen
2017/0155997 A1 6/2017 Boesen
2017/0155998 A1 6/2017 Boesen
2017/0156000 A1 6/2017 Boesen
2017/0161017 A1 6/2017 Chereau et al.
2017/0164890 A1 6/2017 Leip et al.
2017/0178631 A1 6/2017 Boesen
2017/0180842 A1 6/2017 Boesen
2017/0180843 A1 6/2017 Perianu et al.
2017/0180897 A1 6/2017 Perianu
2017/0188127 A1 6/2017 Perianu et al.
2017/0188132 A1 6/2017 Hirsch et al.
2017/0193978 A1 7/2017 Goldman
2017/0195829 A1 7/2017 Belverato et al.
2017/0208393 A1 7/2017 Boesen
2017/0214987 A1 7/2017 Boesen
2017/0215016 A1 7/2017 Dohmen et al.
2017/0230752 A1 8/2017 Dohmen et al.
2017/0251295 A1 8/2017 Pergament et al.
2017/0251933 A1 9/2017 Braun et al.
2017/0257698 A1 9/2017 Boesen et al.
2017/0258329 A1 9/2017 Marsh
2017/0263236 A1 9/2017 Boesen et al.
2017/0263376 A1 9/2017 Verschueren et al.
2017/0266494 A1 9/2017 Crankson et al.
2017/0273622 A1 9/2017 Boesen
2017/0280257 A1 9/2017 Gordon et al.
2017/0297430 A1 10/2017 Hori et al.
2017/0301337 A1 10/2017 Golani et al.
2017/0361213 A1 12/2017 Goslin et al.
2017/0366233 A1 12/2017 Hviid et al.
2018/0007994 A1 1/2018 Boesen et al.
2018/0008194 A1 1/2018 Boesen
2018/0008198 A1 1/2018 Kingscott
2018/0009447 A1 1/2018 Boesen et al.
2018/0011006 A1 1/2018 Kingscott
2018/0011682 A1 1/2018 Milevski et al.

(56) References Cited

U.S. PATENT DOCUMENTS

| | | | |
|---|---|---|---|
| 2018/0011994 | A1 | 1/2018 | Boesen |
| 2018/0012228 | A1 | 1/2018 | Milevski et al. |
| 2018/0013195 | A1 | 1/2018 | Hviid et al. |
| 2018/0014102 | A1 | 1/2018 | Hirsch et al. |
| 2018/0014103 | A1 | 1/2018 | Martin |
| 2018/0014104 | A1 | 1/2018 | Boesen et al. |
| 2018/0014107 | A1 | 1/2018 | Razouane et al. |
| 2018/0014108 | A1 | 1/2018 | Dragicevic et al. |
| 2018/0014109 | A1 | 1/2018 | Boesen |
| 2018/0014113 | A1 | 1/2018 | Boesen |
| 2018/0014140 | A1 | 1/2018 | Milevski et al. |
| 2018/0014436 | A1 | 1/2018 | Milevski |
| 2018/0027342 | A1 | 1/2018 | Meier |
| 2018/0034951 | A1 | 2/2018 | Boesen |
| 2018/0040093 | A1 | 2/2018 | Boesen |
| 2018/0042501 | A1 | 2/2018 | Adi et al. |
| 2018/0056903 | A1 | 3/2018 | Mullett |
| 2018/0063626 | A1 | 3/2018 | Pong et al. |
| 2018/0125415 | A1 | 5/2018 | Reed et al. |
| 2019/0045288 | A1 | 2/2019 | Walraevens et al. |

FOREIGN PATENT DOCUMENTS

| | | | |
|---|---|---|---|
| CN | 104837094 | A | 8/2015 |
| EP | 1469659 | A1 | 10/2004 |
| EP | 1017252 | A3 | 5/2006 |
| EP | 2903186 | A1 | 8/2015 |
| GB | 2074817 | | 11/1981 |
| GB | 2508226 | A | 5/2014 |
| JP | 06292195 | | 10/1998 |
| WO | 2008103925 | A1 | 8/2008 |
| WO | 2008113053 | A1 | 9/2008 |
| WO | 2007034371 | A3 | 11/2008 |
| WO | 2011001433 | A2 | 1/2011 |
| WO | 2012071127 | A1 | 5/2012 |
| WO | 2013134956 | A1 | 9/2013 |
| WO | 2014046602 | A1 | 3/2014 |
| WO | 2014043179 | A3 | 7/2014 |
| WO | 2015061633 | A2 | 4/2015 |
| WO | 2015110577 | A1 | 7/2015 |
| WO | 2015110587 | A1 | 7/2015 |
| WO | 2016032990 | A1 | 3/2016 |
| WO | 2016108230 | A1 | 7/2016 |
| WO | 2016187869 | A1 | 12/2016 |

OTHER PUBLICATIONS

Alzahrani et al: "A Multi-Channel Opto-Electronic Sensor to Accurately Monitor Heart Rate against Motion Artefact during Exercise", Sensors, vol. 15, No. 10, Oct. 12, 2015, pp. 25681-25702, XPO55334602, DOI: 10.3390/s151025681 the whole document.
Announcing the $3,333,333 Stretch Goal (Feb. 24, 2014) pp. 1-14.
Ben Coxworth: "Graphene-based ink could enable low-cost, foldable electronics", "Journal of Physical Chemistry Letters", Northwestern University, (May 22, 2013), pp. 1-7.
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
Bragi is on Facebook (2014), pp. 1-51.
Bragi Update—Arrival of Prototype Chassis Parts—More People—Awesomeness (May 13, 2014), pp. 1-8.
Bragi Update—Chinese New Year, Design Verification, Charging Case, More People, Timeline(Mar. 6, 2015), pp. 1-18.
Bragi Update—First Sleeves From Prototype Tool—Software Development Kit (Jun. 5, 2014), pp. 1-8.
Bragi Update—Let's Get Ready to Rumble, A Lot to be Done Over Christmas (Dec. 22, 2014), pp. 1-18.
Bragi Update—Memories From April—Update on Progress (Sep. 16, 2014), pp. 1-15.
Bragi Update—Memories from May—Update on Progress—Sweet (Oct. 13, 2014), pp. 1-16.
Bragi Update—Memories From One Month Before Kickstarter—Update on Progress (Jul. 10, 2014), pp. 1-17.
Bragi Update—Memories From The First Month of Kickstarter—Update on Progress (Aug. 1, 2014), pp. 1-16.
Bragi Update—Memories From The Second Month of Kickstarter—Update on Progress (Aug. 22, 2014), pp. 1-15.
Bragi Update—New People @Bragi—Prototypes (Jun. 26, 2014), pp. 1-9.
Bragi Update—Office Tour, Tour to China, Tour to CES (Dec. 11, 2014), pp. 1-14.
Bragi Update—Status on Wireless, Bits and Pieces, Testing—Oh Yeah, Timeline(Apr. 24, 2015), pp. 1-18.
Bragi Update—The App Preview, The Charger, The SDK, Bragi Funding and Chinese New Year (Feb. 11, 2015), pp. 1-19.
Bragi Update—What We Did Over Christmas, Las Vegas & CES (Jan. 19, 2014), pp. 1-21.
Bragi Update—Years of Development, Moments of Utter Joy and Finishing What We Started(Jun. 5, 2015), pp. 1-21.
Bragi Update—Alpha 5 and Back to China, Backer Day, on Track(May 16, 2015), pp. 1-15.
Bragi Update—Beta2 Production and Factory Line(Aug. 20, 2015), pp. 1-16.
Bragi Update—Certifications, Production, Ramping Up (Nov. 13, 2015), pp. 1-15.
Bragi Update—Developer Units Shipping and Status(Oct. 5, 2015), pp. 1-20.
Bragi Update—Developer Units Started Shipping and Status (Oct. 19, 2015), pp. 1-20.
Bragi Update—Developer Units, Investment, Story and Status(Nov. 2, 2015), pp. 1-14.
Bragi Update—Getting Close(Aug. 6, 2015), pp. 1-20.
Bragi Update—On Track, Design Verification, How It Works and What's Next(Jul. 15, 2015), pp. 1-17.
Bragi Update—On Track, On Track and Gems Overview (Jun. 24, 15), pp. 1-19.
Bragi Update—Status on Wireless, Supply, Timeline and Open House@Bragi(Apr. 1, 2015), pp. 1-17.
Bragi Update—Unpacking Video, Reviews on Audio Perform and Boy are we Getting Close(Sep. 10, 2015), pp. 1-15.
Farr, Christina: "iPads In Every Hospital: Apple's Plan to Crack The $3 Trillion Health Care Sector", "https://www.fastcompany.com/3069060/artists-and-scientists-are-teaming-with-businesses-and-non-profits-on-gender-concerns" (Mar. 18, 2017).
Healthcare Risk Management Review, "Nuance updates computer-assisted physician documentation solution" (Oct. 20, 2016), pp. 1-2.
Hoffman, "How to Use Android Beam to Wirelessly Transfer Content Between Devices", (Feb. 22, 2013).
Hoyt et al., "Lessons Learned from Implementation of Voice Recognition for Documentation in the Military Electronic Health Record System", The American Health Information Management Association (2017), pp. 1-8.
Hyundai Motor America, "Hyundai Motor Company Introduces A Health + Mobility Concept for Wellness in Mobility", Fountain Valley, Californa (2017), pp. 1-3.
International Search Report & Written Opinion, PCT/EP2016/070216 (Oct. 18, 2016) 13 pages.
International Search Report & Written Opinion, PCT/EP2016/070231 (Nov. 18, 2016) 12 pages.
International Search Report & Written Opinion, PCT/EP2016/070245 (Nov. 16, 2016) 10 pages.
International Search Report & Written Opinion, PCT/EP2016/070247 (Nov. 18, 2016) 13 pages.
International Search Report and Written Opinion, PCT/EP2016/070228 (Jan. 9, 2017) 13 pages.
Jain A et al: "Score normalization in multimodal biometric systems", Pattern Recognition, Elsevier, GB, vol. 38, No. 12, Dec. 31, 2005, pp. 2270-2285, XPO27610849, ISSN: 0031-3203.
Last Push Before The Kickstarter Campaign Ends on Monday 4pm CET (Mar. 28, 2014), pp. 1-7.

(56) References Cited

OTHER PUBLICATIONS

Lovejoy: "Touch ID built into iPhone display one step closer as third-party company announces new tech", "http://9to5mac.com/2015/07/21/virtualhomebutton/" (Jul. 21, 2015).
Nemanja Paunovic et al, "A methodology for testing complex professional electronic systems", Serbian Journal of Electrical Engineering, vol. 9, No. 1, Feb. 1, 2012, pp. 71-80, XPO55317584, Yu.
Nigel Whitfield: "Fake tape detectors, 'from the stands' footie and Ugh? Internet of Things in my set-top box"; http://www.theregister.co.uk/2014/09/24/ibc_round_up_object_audio_dlna_iot/ (Sep. 24, 2014).
Nuance, "ING Netherlands Launches Voice Biometrics Payment System in the Mobile Banking App Powered by Nuance", "https://www.nuance.com/about-us/newsroom/press-releases/ing-netherlands-launches-nuance-voice-biometrics.html", 4 pages (Jul. 28, 2015).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014), pp. 1-14.
Stretchgoal—The Carrying Case for The Dash (Feb. 12, 2014), pp. 1-9.
Stretchgoal—Windows Phone Support (Feb. 17, 2014), pp. 1-17.
The Dash + The Charging Case & The Bragi News (Feb. 21, 2014), pp. 1-12.
The Dash—A Word From Our Software, Mechanical and Acoustics Team + An Update (Mar. 11, 2014), pp. 1-7.
Update From Bragi—$3,000,000—Yipee (Mar. 22, 2014), pp. 1-11.
Weisiger; "Conjugated Hyperbilirubinemia", Jan. 5, 2016.
Wertzner et al., "Analysis of fundamental frequency, jitter, shimmer and vocal intensity in children with phonological disorders", V. 71, n.5, 582-588, Sep./Oct. 2005; Brazilian Journal of Othrhinolaryngology.
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).

* cited by examiner

SELECTIVE AUDIO ISOLATION FROM BODY GENERATED SOUND SYSTEM AND METHOD

PRIORITY STATEMENT

This application is a continuation of U.S. patent application Ser. No. 17/879,319 filed Aug. 2, 2022, which is a continuation of U.S. patent application Ser. No. 17/147,329, filed Jan. 12, 2021 now U.S. Pat. No. 11,417,307, which is a continuation of U.S. patent application Ser. No. 16/101,894, filed Aug. 13, 2018 now U.S. Pat. No. 10,896,665, which is a continuation of U.S. patent application Ser. No. 15/801,045 filed on Nov. 1, 2017 now U.S. Pat. No. 10,062,373, which claims priority to U.S. Provisional Patent Application 62/417,195, filed on Nov. 3, 2016, all of which are titled Selective Audio Isolation from Body Generated Sound System and Method, and all of which are hereby incorporated by reference in their entireties.

FIELD OF THE INVENTION

The present invention relates to wearable devices. More particularly, but not exclusively, the present invention relates to earpieces.

BACKGROUND

People generate a great deal of body noise through their everyday movements. While such sounds are generally not a problem, when a user wears an earpiece, the user tends to focus on such sounds to the detriment of their use and enjoyment of the earpiece. What is needed is a system and method to reduce or eliminate such body noise, so a user may enjoy the use and enjoyment of the earpiece without undue distraction.

SUMMARY

Therefore, it is a primary object, feature, or advantage of the present invention to improve over the state of the art.

It is a further object, feature, or advantage of the present invention to eliminate body noise through the use of an active noise cancellation system.

It is a still further object, feature, or advantage of the present invention to eliminate body noise through the filtering of body noise acquired using one or more microphones connected to an earpiece.

Another object, feature, or advantage is to eliminate outside noise in addition to body noise.

In one implementation, a system includes an earpiece having an earpiece housing, at least one microphone mounted onto the earpiece housing, wherein at least one microphone is configured to receive at least one body generated sound, a processor disposed within the earpiece housing and operatively connected to each microphone, wherein the processor is configured to neutralize each body generated sound, and a speaker operatively connected to the processor, wherein the speaker is configured to transduce audio signals.

One or more of the following features may be included. The earpiece housing may be composed of soundproof materials. The earpiece may comprise a set of earpieces. The set of earpieces may comprise a left earpiece and a right earpiece. Each earpiece may be configured to substantially encompass an external auditory canal of a user. Each earpiece may be further configured to substantially fit within a user's ear canal. One or more microphones may comprise an air microphone and a bone conduction microphone. One or more microphones may be further configured to filter one or more body generated sounds. The body generated sound filtering may be performed within a specific decibel range. The neutralization of each body generated sound may be performed by superimposing a cancellation signal to an audio signal communicated by the speaker, wherein the cancellation signal is configured so the superimposition of each cancellation signal with each body generated noise substantially nets to zero decibels. The neutralization of each body generated sound may be performed by filtering each body generated sound from audio signals using one or more microphones. Audio signals to the speaker may be suppressed or attenuated if the audio signal exceeds a specific decibel range.

In another implementation, a method of filtering body generated sounds from an audio signal using an earpiece includes providing at least one audio signal, receiving at least one body generated sound through a microphone, separating each body generated sound from each audio signal using a processor, and communicating each audio signal using a speaker.

One or more of the following features may be included. One or more earpieces may be configured to substantially encompass an external auditory canal of a user. One or more microphones may filter one or more audio signals. The separation of each body generated sound from each audio signal may be performed through the generation of a cancellation signal by the processor, wherein the cancellation signal is configured as to substantially net to zero decibels when superimposed onto a body generated sound. The separation of each body generated sound from each audio signal may be performed through the filtering of each body generation sound.

According to another aspect, a wireless earpiece includes a wireless earpiece housing, a processor disposed within the wireless earpiece housing, at least one microphone operatively connected to the processor, and at least one speaker operatively connected to the processor. The processor is configured to receive audio from the at least one microphone, perform processing of the audio to provide processed audio, and output the processed audio to the at least one speaker. The processing of the audio may include identifying body generated sounds generated by a body of a user of the wireless earpiece and removing the body generated sounds. The at least one microphone may include both an air microphone and a bone microphone. The identifying the body generated sounds may be performed by comparing a first audio signal from the air microphone with a second audio signal from the bone microphone. The removing the body generated sounds may be performed by superimposing a cancellation signal to the audio. The removing the body generated sounds may be performed by filtering the body generated sounds from the audio. The body generated sounds may include at least one of a click or a pop generated by movement of a temporomandibular joint of the user.

According to another aspect, a method of removing body generated sounds by an earpiece may include providing the earpiece. The earpiece may include a wireless earpiece housing, a processor disposed within the wireless earpiece housing, at least one microphone operatively connected to the processor and at least one speaker operatively connected to the processor, wherein the processor is configured to receive audio from the at least one microphone, perform processing on the audio to provide processed audio, and output the processed audio to the at least one speaker. The method may include receiving audio from the at least one microphone at the processor, performing processing on the audio to provide processed audio, wherein the processing of the audio comprises identifying body generated sounds generated by a body of a user of the wireless earpiece and removing the body generated sounds, and outputting the processed audio to the at least one speaker of the wireless earpiece. The at least one microphone may include an air microphone and a bone microphone. The step of identifying the body generated sounds may be performed by comparing a first audio signal from the air microphone with a second audio signal from the bone microphone. The step of removing the body generated sounds may be performed using active noise cancellation. The step of removing the body generated sounds may be performed by filtering.

According to another aspect, a set of wireless earpieces includes a first wireless earpiece having a first wireless earpiece housing, a processor disposed within the first wireless earpiece housing, at least one first wireless earpiece microphone operatively connected to the first wireless earpiece processor, a first wireless earpiece transceiver operatively connected to the first wireless earpiece processor, and at least one first wireless earpiece speaker operatively connected to the first wireless earpiece processor. The set of wireless earpieces may further include a second wireless earpiece comprising a second wireless earpiece housing different from the first wireless earpiece housing, at least one second wireless earpiece microphone, at least one second wireless earpiece speaker, and at least one second wireless earpiece transceiver. The transceiver of the second wireless earpiece may communicate with the transceiver of the first wireless earpiece. The first wireless earpiece processor may be configured to receive audio from the at least one first wireless earpiece microphone and from the at least one second wireless earpiece microphone, perform processing of the audio to provide processed audio, and output the processed audio to the at least one first wireless earpiece speaker. The processing of the audio may involve identifying body generated sounds generated by a body of a user of the first wireless earpiece and the second wireless earpiece and removing the body generated sounds. The at least one first wireless earpiece microphone may include a first wireless earpiece air microphone and a first wireless earpiece bone microphone. The at least one second wireless earpiece microphone may include a second wireless earpiece air microphone and a second wireless earpiece bone microphone. The step of identifying the body generated sounds may be performed by comparing audio signals from the first wireless earpiece air microphone with the first wireless earpiece bone microphone and from the second wireless earpiece air microphone with the second wireless earpiece bone microphone. The step of removing the body generated sounds may be performed by superimposing a cancellation signal to the audio. The step of removing the body generated sounds may be performed by filtering the body generated sounds from the audio. The body generated sounds may include at least one of a click or a pop generated by movement of a temporomandibular joint of the user.

One or more of these and/or other objects, features, or advantages of the present invention will become apparent from the specification and following claims. No single embodiment need provide each and every object, feature, or advantage. Different embodiments may have different objects, features, or advantages. Therefore, the present invention is not to be limited to or by an object, feature, or advantage stated herein.

DETAILED DESCRIPTION

Figure 1:
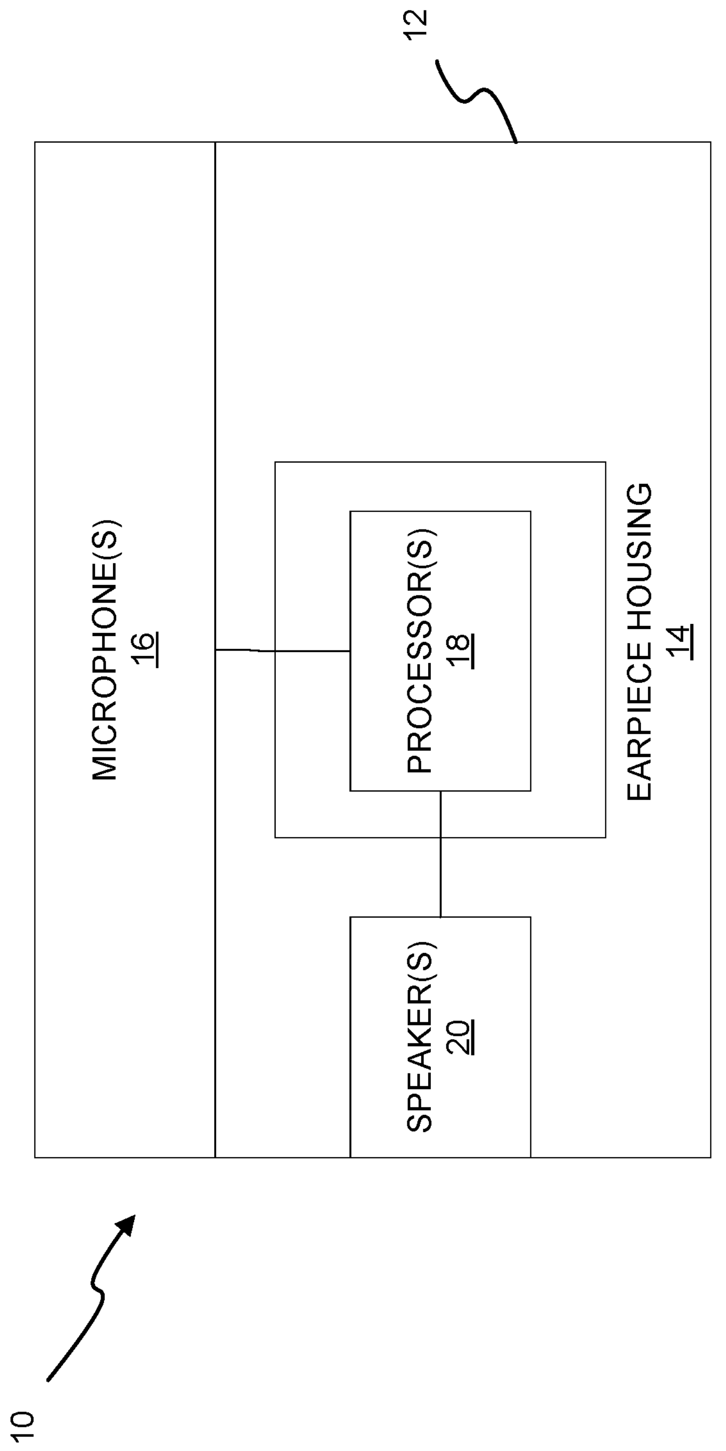
FIG. 1 is a block diagram regarding a first embodiment of the system.

FIG. 1 shows a block diagram of one embodiment of the system 10 having an earpiece 12 with an earpiece housing 14, one or more microphones 16 associated with the earpiece housing 14, a processor 18 disposed within the earpiece housing 14 and operatively connected to each microphone 16, and a speaker 20 disposed within the earpiece housing 14 and operatively connected to the processor 18. The earpiece housing 14 may be composed of any material resistant to shear and strain and unlikely to cause skin allergies or rashes. In addition, the earpiece housing 14 may be composed of soundproof materials and may also be configured as to be waterproof. The earpiece housing 14 may also substantially encompass the external auditory canal of a user in order to substantially reduce or eliminate external sounds. One or more microphones 16 associated with the external housing 14 may be configured to receive external sounds in addition to body generated sounds.

One or more microphones 16 may be located on or within any part of the earpiece housing 14 conducive to receiving a body generated sound and may also include air and bone conduction microphones configured to receive sounds. In one mode of operation, the wireless earpiece may prevent environmental sounds from being heard by a user. In another mode of operation, the wireless earpiece 12 may provide an audio transparency function where sounds detected from the environment with one or more microphones 16 may be reproduced at one or more speakers 20 of the wireless earpiece 12.

Various methods of identifying body generated sounds are contemplated. In one embodiment audio signals from one or more bone conduction microphones are compared with audio signals from one or more air conduction microphones to identify body generated sounds. In another embodiment, processing of audio signals may be used to determine a source of the sound, for example when two microphones of a wireless earpiece detect the same sound at different instances in time, a determination may be made if the sound propagated from the environment to the microphones or from the body to the microphones. In addition, body generated sounds may be determined by comparison of audio to known body generated sounds or comparison of properties of audio signals to properties of known body generated sounds. Such comparisons may be facilitated through the use of training sets of body generated sounds or asking a user to generate different body generated sounds. Any number of other methods may be used to identify as sound as a body generated sound. The processor 18 is disposed within the earpiece housing 14 and operatively connected to each microphone 16 and is configured to neutralize or otherwise attenuate or cancel any body generated sound signal it receives. The processor 18 may perform this function through active noise cancellation, where a cancellation signal is superimposed onto each body generated sound through destructive interference so as to substantially reduce the effect of the body generated sound, or may simply filter out a body generated sound using an algorithm stored within the processor 18 configured to identify which sounds may be body generated sounds identified by the algorithm from reaching the processor 18. These processes may be performed continuously or discretely, and the processor 18 may determine more than one cancellation signal if necessary depending on the body generated sounds received by the microphones 16. The processor 18 may also be configured to produce the audio signals communicated to a user's tympanic membrane, filter out external sounds which are not body generated sounds, and/or regulate other functions of the earpiece 12. The speaker 20 configured to transduce audio signals substantially free of body generated sounds to a user's tympanic membrane.

Figure 2:
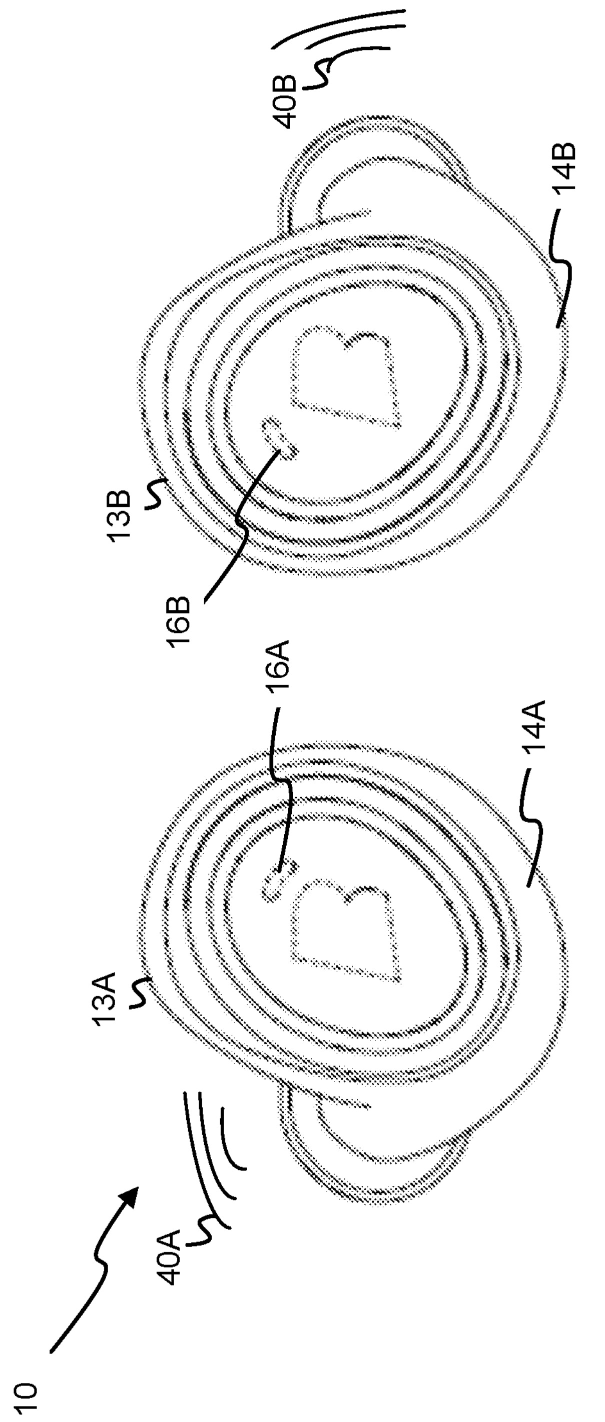
FIG. 2 illustrates a left earpiece and a right earpiece.

FIG. 2 illustrates a system 10 which includes a left earpiece 13A and a right earpiece 13B. The left earpiece 13A has a left earpiece housing 14A. The right earpiece 13B has a right earpiece housing 14B, the left earpiece housing 14A different from the right earpiece housing 14. The left earpiece 13A and the right earpiece 13B may be configured to fit around a user's ear canal so as to minimize the amount of external sound capable of reaching the ear canal as well as configured to fit within the ear canal so as to minimize the distance between the speakers and a user's tympanic membranes and maintain good fit. The earpiece housings 14A and 14B may be composed of soundproof or shear resistant materials and may also be configured to be waterproof. A microphone 16A is shown on the left earpiece 13A and a microphone 16B is shown on the right earpiece 13B. The microphones 16A and 16B may be located anywhere on the earpieces 13A and 13B respectively and may be configured to receive ambient environmental sounds or a user's instructions to control one or more earpiece functions in addition to non-vocal body generated sounds. The earpieces 13A and 13B may be configured to communicate audio signals 40A and 40B respectively to a user's tympanic membranes.

Figure 3:
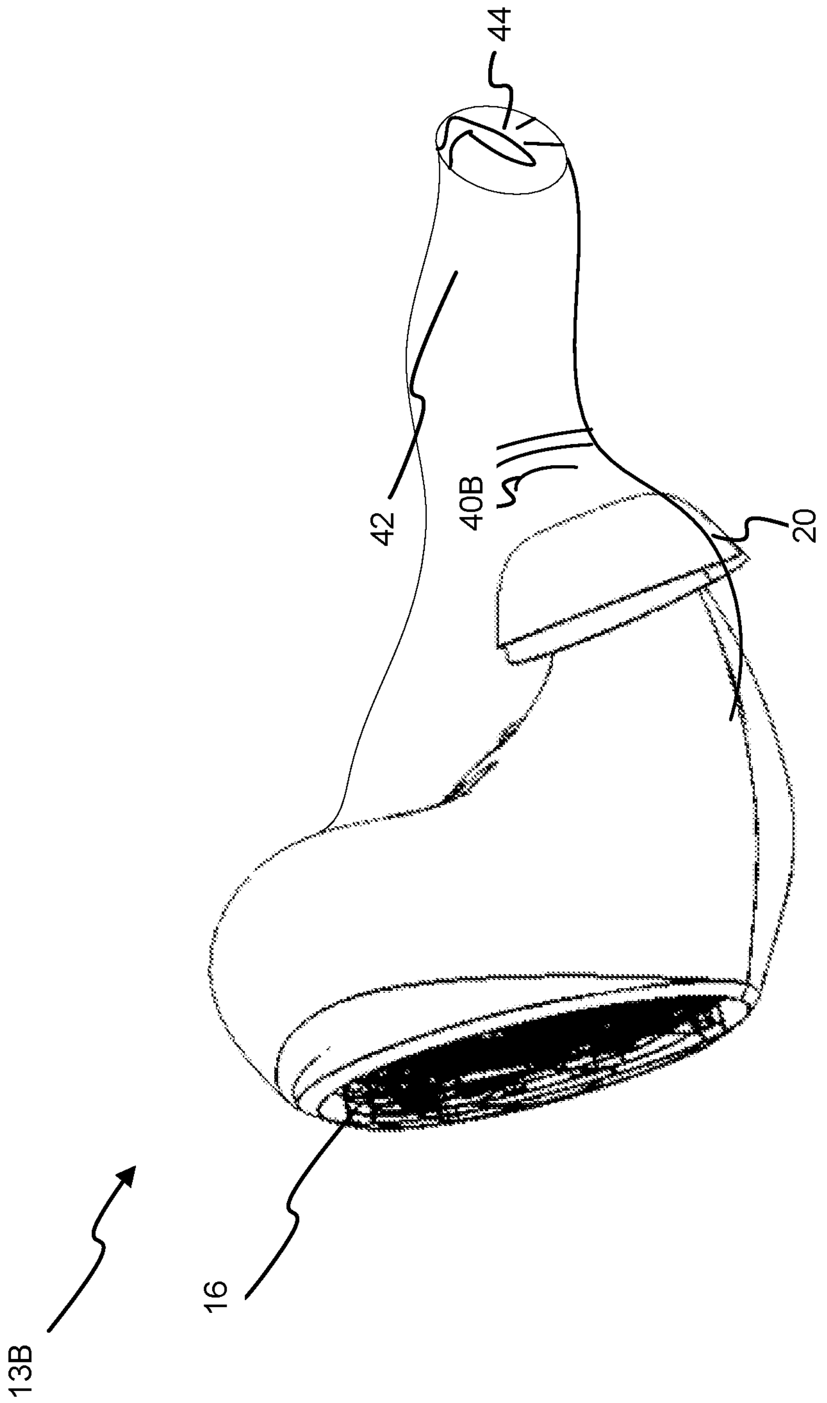
FIG. 3 illustrates a side view of the right earpiece and its relationship with a user's ear.

FIG. 3 illustrates a side view of a right earpiece 13B and its relationship to a user's ear. The right earpiece 13B may be configured to both minimize the amount of external sound reaching the user's ear canal 42 and to facilitate the transmission of the audio signal 40B from the speaker 20 to a user's tympanic membrane 44. The right earpiece 13B may be configured to be of any size necessary to fit within the user's ear canal 42 and the distance between the speaker 20 and the user's tympanic membrane 44 may be any distance sufficient to facilitate transmission of the audio signal 40B to the user's tympanic membrane 44. A microphone 16 is shown on the outside of the right earpiece 13B. The microphone 16 may be configured to, in addition to receiving body generated noise, receive sounds from a user or the outside environment which may be used to reconfigure, change, or otherwise modify one or more functions of the earpiece 13B.

Figure 4:
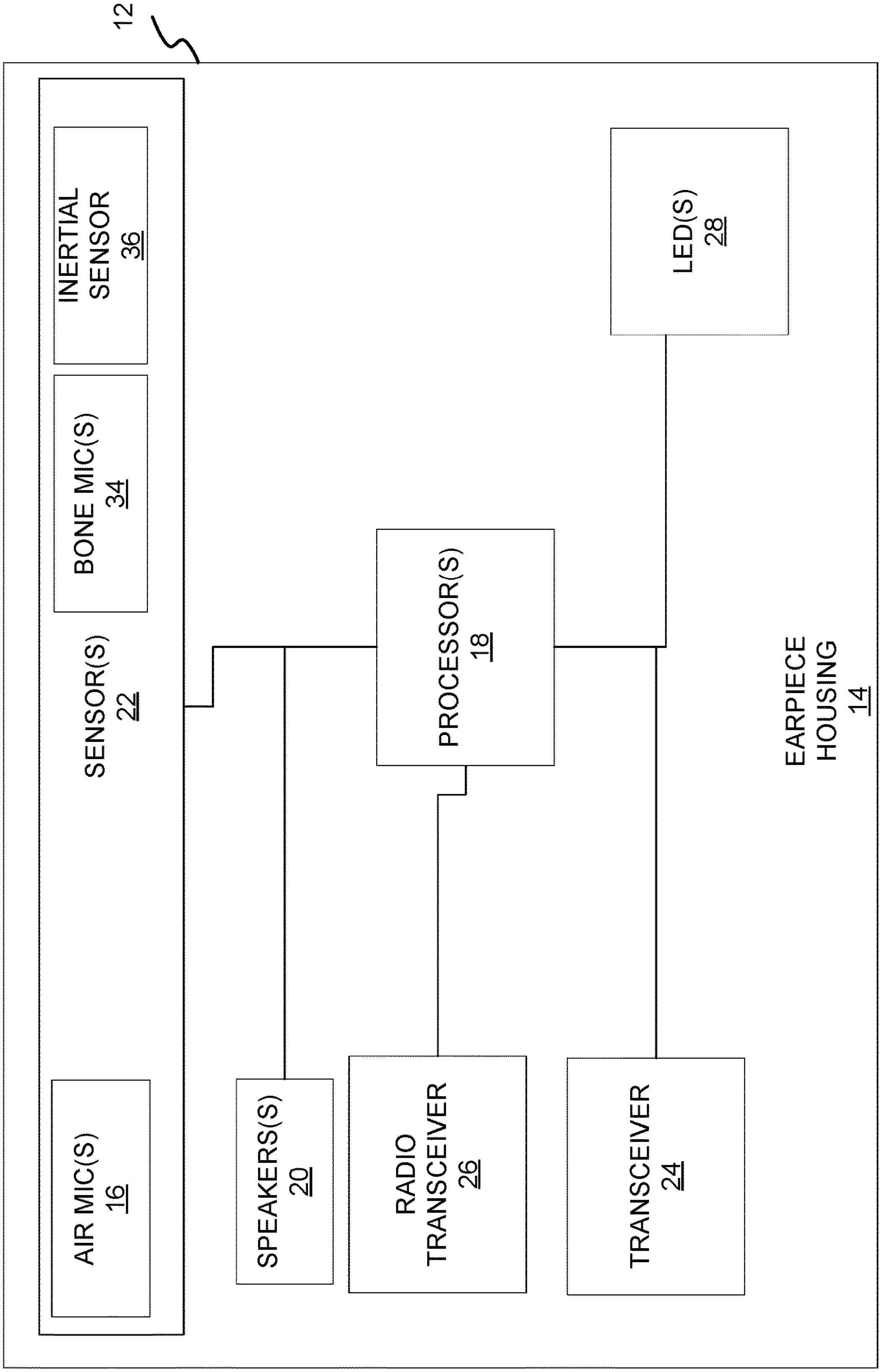
FIG. 4 is another block diagram regarding a second embodiment of the system.

FIG. 4 is a block diagram of another embodiment of the system which includes an earpiece 12 with an earpiece housing 14, a plurality of sensors which may include an air microphone 16 and a bone microphone 34. Additional microphones may be present. A speaker 20 is operatively connected to the processor 18. Other examples of sensors 22 which may be present may include one or more inertial sensors 36. A radio transceiver 26 is operatively connected to the one or more processors 18. Another transceiver 24 may be present which may provide for communicating between left and right earpieces. The transceiver 24 may be a near field magnetic induction (NFMI) transceiver. One or more LEDs may also be operatively connected to the one or more processors 18 to provide for visual feedback of operations of the device.

Figure 5:
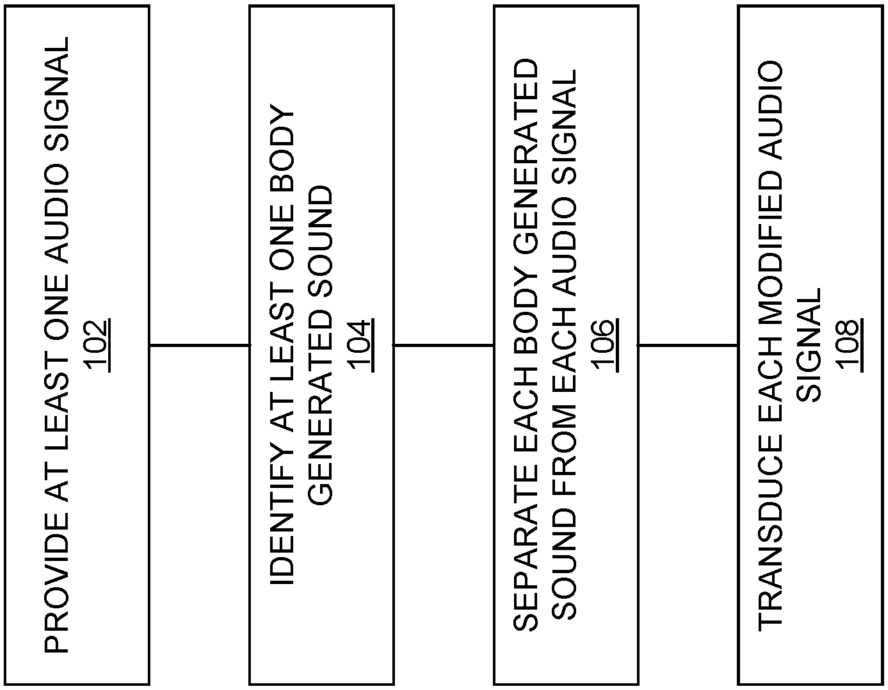
FIG. 5 includes a flowchart of one implementation of the method of filtering body generated sounds from an audio signal using an earpiece.

FIG. 5 illustrates one implementation of the method of removing body generated sounds. In step 102, an audio signal is provided such as may be detected using one or more microphones of an earpiece. In step 104, at least one body generated sound is identifying within the one or more audio signals. The body generated sounds may originate from anywhere on a user's body and need not be physiologic in nature. For example, a body generated sound may be due to a necklace moving around the user's neck, a sole installed within a shoe the user is wearing, baggy pants the user may be wearing, or otherwise be body generated. In step 106, a processor separates any audio signals from body generated sounds. The process by which a processor may perform this step include through a noise cancellation signal or through filtering or active filtering using one or more algorithms or otherwise. In step 108, the modified audio signal is transduced.

Figure 6:
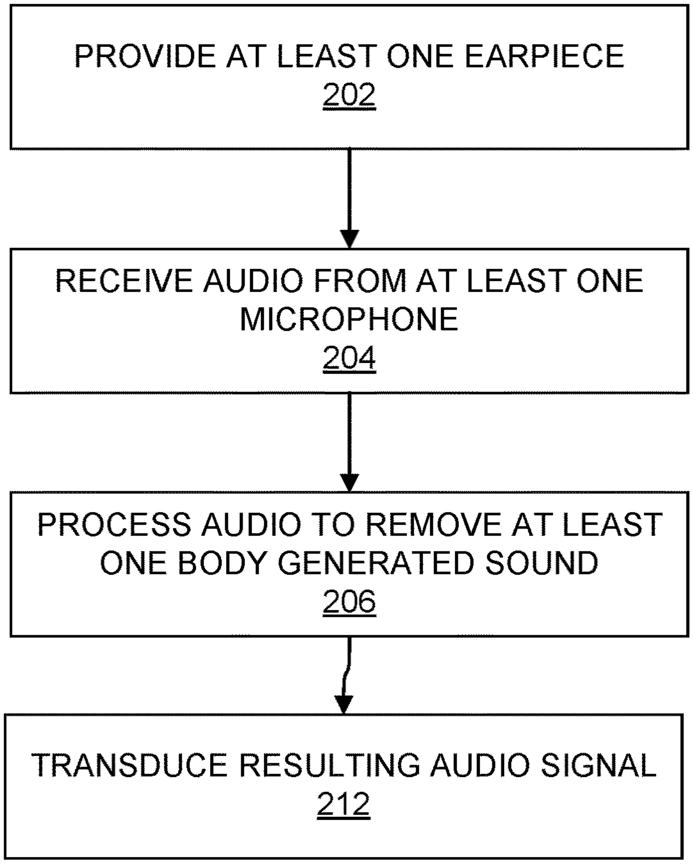
FIG. 6 includes a flowchart of a second implementation of the method of filtering body generated sounds from an audio signal using an earpiece.

FIG. 6 shows another example of a method of filtering body generated sounds from an audio signal using an earpiece. In step 202, an earpiece is provided such as of one of the examples previously described. In step 204, audio is received from one or more of the microphones. In step 206, the audio is processed to remove at least one body generated sound. In step 212, the resulting audio signal(s) are transduced at one or more speakers of the wireless earpiece.

It should also be appreciated where there is a set of wireless earpieces such as shown in FIG. 2, audio from one of the wireless earpieces may communicated to the other earpiece and be processed by the other earpiece to remove body generated sounds. Having audio from both locations may provide additional information about the sound to assist in processing, for example, it may provide additional information regarding locating the sound.

Thus, the system and method described herein allow for selectively monitoring for body generated sounds, e.g. the click or pop generated by movement of the user's temporomandibular joint. Such sounds may be detected by microphones incorporated into the earpiece device and then extracted from the audio output signal delivered through the speaker system of the device to the middle ear. Such a device allows for mitigating the effects of body induced sound in order to allow the user to concentrate more fully on the selected device output. Moreover, an earpiece as described herein allows for monitoring body created sound inputs delivered to the middle ear through the air or bone conduction systems present in the body, allows for creating effective audio isolation through the use of isolation measures which would include masking noise or signal extraction algorithms, and allows a user to more fully concentrate on the audio input delivered to the middle ear by reducing or subtracting the sound inputs from body generated noise inputs.

Therefore, various methods, system, and apparatus have been shown and described. Although specific examples or embodiments are shown herein it is to be understood various elements or steps from different embodiments may be combined. It is to be further understood numerous options, variations, and alternatives are contemplated.

What is claimed is:

1. A wireless earpiece comprising: a wireless earpiece housing; a processor disposed within the wireless earpiece housing; a plurality of microphones operatively connected to the processor; at least one speaker operatively connected to the processor; wherein the processor is configured to receive audio from the plurality of microphones, perform processing of the audio to provide processed audio, and output the processed audio to the at least one speaker to provide an audio transparency function; wherein the processing of the audio comprises identifying sounds to remove based on training data associated with sounds to remove and then remove the sounds to remove from the processed audio, wherein the sounds to remove are body generated sounds generated by a body of a user of the wireless earpiece.

2. The wireless earpiece of claim 1, wherein the removing the body generated sounds is performed by superimposing a cancellation signal to the audio.

3. The wireless earpiece of claim 1, wherein the removing the body generated sounds is performed by filtering the body generated sounds from the audio.

4. The wireless earpiece of claim 1, wherein the body generated sounds comprise at least one of a click or a pop generated by movement of a temporomandibular joint of the user.

5. The wireless earpiece of claim 1, wherein the body generated sounds comprise sounds generated by movement of the user.

6. The wireless earpiece of claim 1, wherein the body generated sound comprises sounds generated by items worn by the user as the user moves.

7. The wireless earpiece of claim 1 wherein the processor is further configured to receive the audio from one or more microphones of a second wireless earpieces in operative communication with the wireless earpiece.

8. A method of removing body generated sounds by an earpiece comprising:

providing the earpiece, the earpiece comprising a wireless earpiece housing, a processor disposed within the wireless earpiece housing, a plurality of microphones operatively connected to the processor and at least one speaker operatively connected to the processor, wherein the processor is configured to receive audio from the plurality of microphones, perform processing on the audio to provide processed audio, and output the processed audio to the at least one speaker;

receiving audio from the plurality of microphones at the processor;

performing processing on the audio to provide processed audio, wherein the processing of the audio comprises identifying body generated sounds generated by a body of a user of the wireless earpiece and removing the body generated sounds from environmental audio detected by the plurality of microphones based on training data associated with body generated sounds; and outputting the processed audio to the at least one speaker of the wireless earpiece.

9. The method of claim 8 wherein the plurality of microphones include an air microphone and a bone microphone.

10. The method of claim 8 wherein the removing the body generated sounds is performed using active noise cancellation.

11. The method of claim 8 wherein the removing the body generated sounds is performed by filtering.

12. The method of claim 8 wherein the body generated sounds comprise at least one of a click or a pop generated by movement of a temporomandibular joint of the user.

13. The method of claim 8 wherein the body generated sounds comprise sounds generated by movement of the user.

14. The method of claim 8 wherein the body generated sound comprises sounds generated by items worn by the user as the user moves.

15. The wireless earpiece of claim 8 wherein the processor is further configured to receive the audio from one or more microphones of a second wireless earpieces in operative communication with the wireless earpiece.

16. A wireless earpiece comprising:

a wireless earpiece housing;

a processor disposed within the wireless earpiece housing;

a plurality of microphones operatively connected to the processor;

at least one speaker operatively connected to the processor;

wherein the processor is configured to receive audio from the plurality of microphones, perform processing of the audio to provide processed audio, and output the processed audio to the at least one speaker to provide an audio transparency function;

wherein the processing of the audio comprises identifying body generated sounds generated by a body of a user of the wireless earpiece to remove based on training data associated with sounds to remove and then remove the sounds to remove from the processed audio.

* * * * *